United States Patent [19]

Kice

[11] Patent Number: 4,495,113
[45] Date of Patent: Jan. 22, 1985

[54] ROTARY MIXING DAMPER METHOD AND MEANS

[75] Inventor: John E. Kice, Wichita, Kans.

[73] Assignee: Kice Metal Products Co., Inc., Wichita, Kans.

[21] Appl. No.: 381,557

[22] Filed: May 24, 1982

[51] Int. Cl.³ .............................................. F24F 6/12
[52] U.S. Cl. .................................. 261/64 R; 98/31.5; 98/34.5; 261/117
[58] Field of Search .................. 98/33 A, 38 R, 38 A, 98/38 B, 38 D, 38 E, 38 F; 165/16; 236/13; 261/64 R, 117, DIG. 27

[56] References Cited

U.S. PATENT DOCUMENTS

| | | | |
|---|---|---|---|
| 1,471,112 | 10/1923 | Ellis | 236/13 X |
| 1,938,833 | 12/1933 | Irons, Jr. | 98/33 A X |
| 3,618,508 | 11/1971 | Tutt | 236/13 X |
| 4,079,665 | 3/1978 | Martin | 98/33 A X |

FOREIGN PATENT DOCUMENTS 3557 1/1980 Japan ............................... 98/38 R Primary Examiner—Harold Joyce
Attorney, Agent, or Firm—John H. Widdowsen

[57] ABSTRACT

An improved air stabilization system and method used in a building ventilation system. The improvement comprises positioning rotatably a single mixing damper blade within a damper blade housing such as to regulate the air flow through air openings within the housing.

2 Claims, 11 Drawing Figures

ROTARY MIXING DAMPER METHOD AND MEANS

BACKGROUND OF THE INVENTION

1. Field of the Invention

This invention provides an improved air stabilization system and method. More specifically, this invention contemplates an improved air stabilization system and method for a building ventilation system.

2. Description of the Prior Art

U.S. Pat. No. 4,079,665 by Martin illustrates a ventilation system. U.S. Pat. No. 3,727,537 by Harty, Jr. discloses an air distribution unit including a paddle that serves as an apportioner for air in the system. U.S. Pat. No. 3,722,395 by Courchesne discloses a damper in a window type air conditioning unit that serves to proportion air. None of the foregoing prior art teaches or suggests the particular improved air stabilization system and method of this invention, which offers to the industry a substitute or replacement for the common and more complex prior art face and bypass damper arrangement.

SUMMARY OF THE INVENTION

This invention accomplishes its desired objects by providing an improved air stabilization system for a building ventilation system which has an air propulsion means for delivering and/or intaking air through a plurality of openings in a housing having a damper assembly. The improvement includes rotatably positioning within the housing a single mixing damper blade means such as to regulate the air flow through the openings of the housing to allow either intake of ambient air to exhaust air from the building or to blend air from the building with outside air or to circulate only building air by completely closing off any intake of ambient air and exhaust of building air.

It is an object of the invention to provide a novel improved air stabilization system and method.

Still further objects of the invention reside in the provision of an air stabilization system having one moving part with little pressure drop, and is relatively inexpensive to manufacture.

These, together with the various ancillary objects and features which will become apparent as the following description proceeds, are attained by this invention, preferred embodiments being shown in the accompanying drawings, by way of example only, wherein:

DETAILED DESCRIPTION OF THE INVENTION

Figure 10:
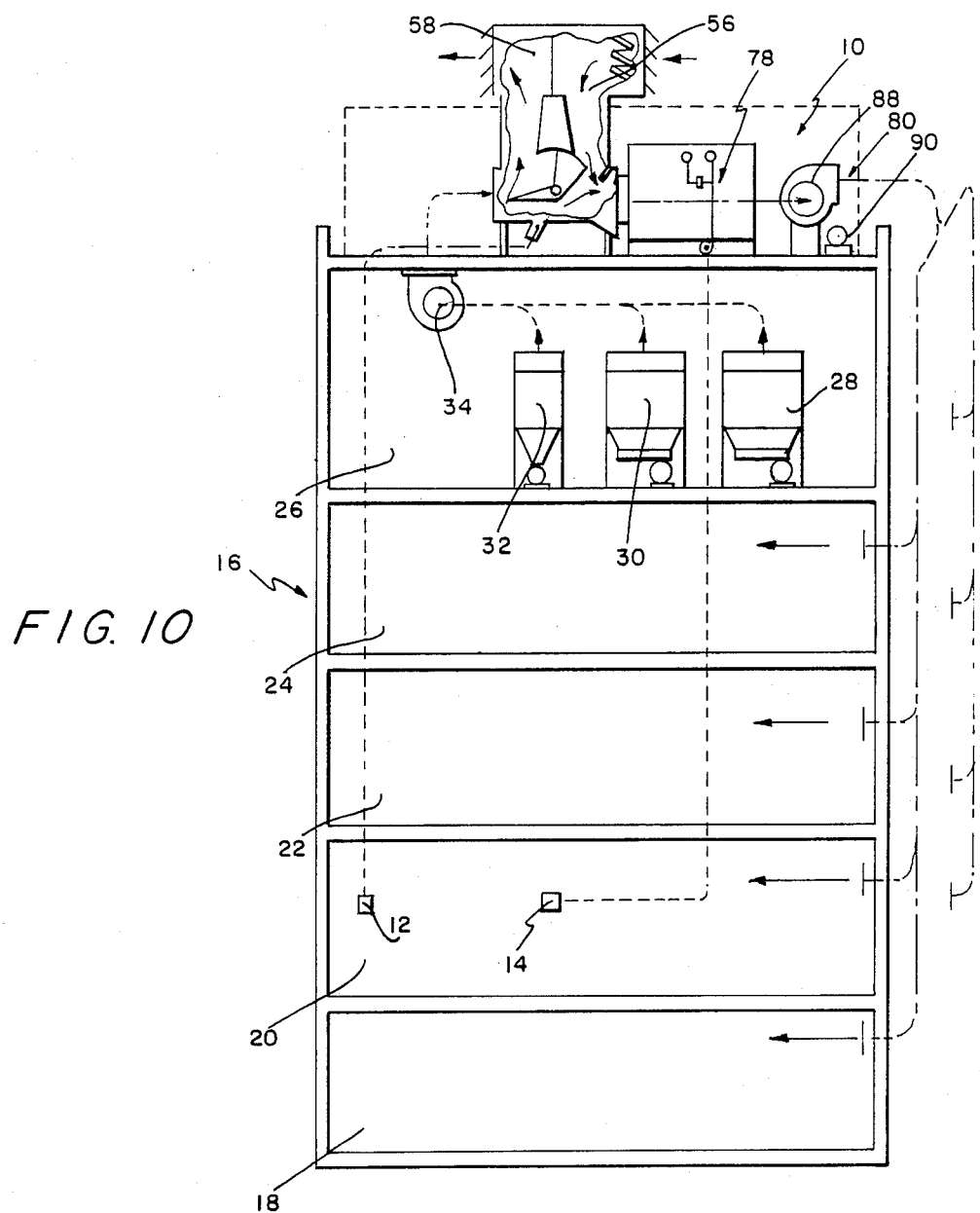
FIG. 10 is a schematic view of the single damper blade assembly air stabilization system diagram.

Referring in detail now to the drawings, wherein like reference numerals designate similar parts throughout the various views, and in particular to FIG. 10, there is seen the improved air stabilization system used in a building ventilation system. The building ventilation system (see FIG. 10) comprises the improved air stabilization system, generally illustrated as 10, and a modulating thermostat 12 to control air stabilization system 10; and a humidistat 14 to control the amount of moisture placed in the air prior to being circulated back into the building, generally illustrated as 16, having a basement 18, rolls at 20, purifiers at 22, sifters at 24 and pneumatics at 26. On the same level at 26 are collectors 28, filter 30, and mill 32. A fan 34 sucks air from the building 16, especially from mill 32, filter 30 and collectors 28 and discharges the same into the improved air stabilization system 10.

Figure 11:
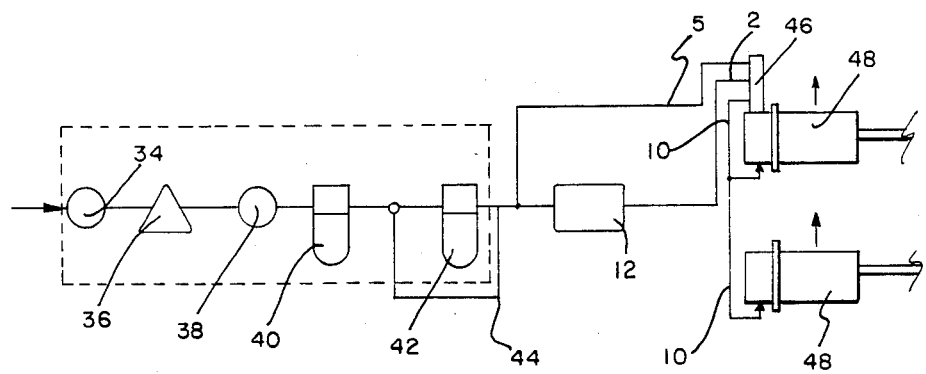
FIG. 11 is a schematic view of the modugate control circuit.

The control circuit (see FIG. 11) includes a high pressure gauge 34, a regulator 36 (set to 20 psi max), a low pressure gauge 38, and a filter 40. A dryer 42 ($\frac{1}{4}$ NPT IN/OUT) is preferably included, especially for winter conditions. Bypass line 44 is optional. Pneumatic thermostat 12 (5/32 IN/OUT) interengages to a pilot actuator control box 46 mounted on one of the modugate actuators 48—48 and includes ports marked S (Supply), O (Output), and P (Port). Thermostat O port is tubed to P port on the actuator control box 46. Supply air (20 psi max) is tubed to S port on the actuator control box 46. O port on the box 46 is tubed to the actuators 48—48. If the control box 46 is in the outside atmosphere, it must be covered and insulated, depending on the climate.

Figure 1:
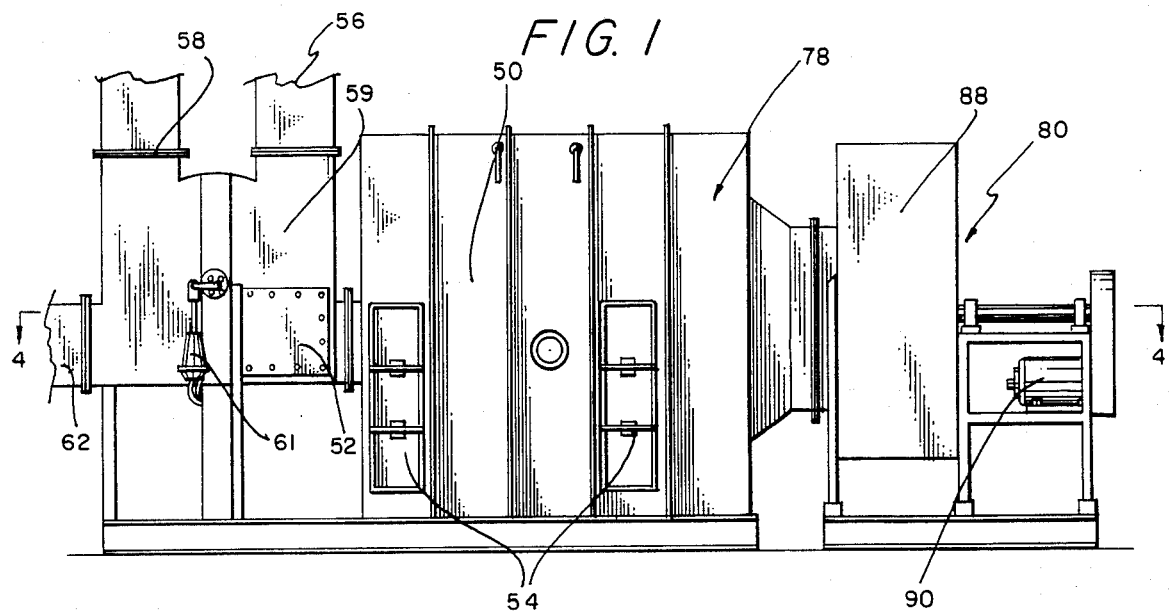
FIG. 1 is a side elevational view of the invention.
Figure 2:
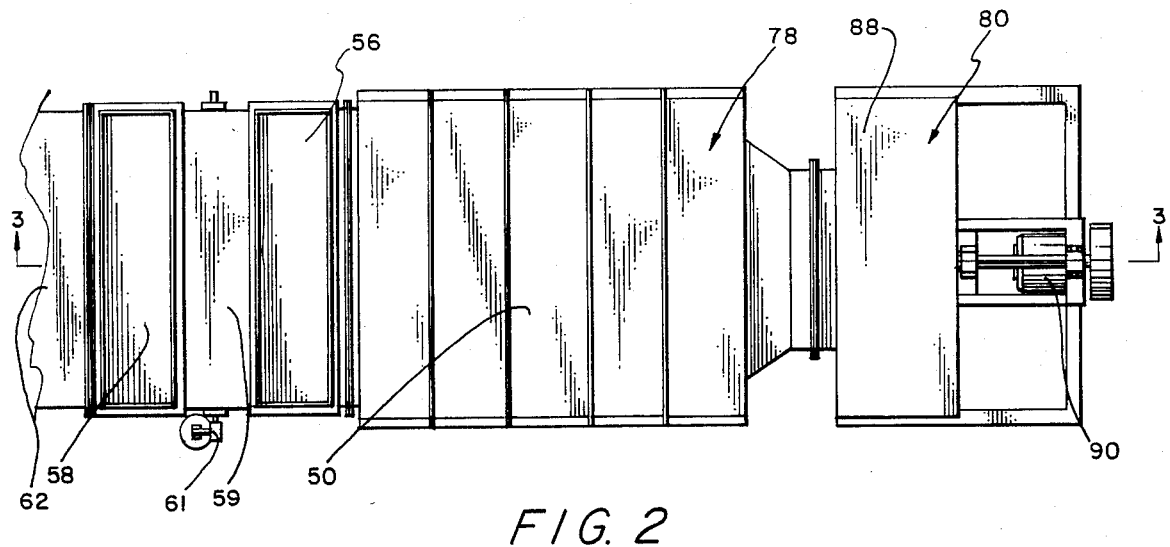
FIG. 2 is a top plan view of the invention.

The improved air stabilization system 10 has a cabinet 50 (see FIGS. 1 and 2) with plates 52 and plates 54—54. Air intake channel opening 56 and air exhaust channel opening 58 are provided for the intake of atmospheric air and the exhaust of building air, respectively, from and to a modugate chamber 59.

A simple modugate damper 60 is pivotally connected within the chamber 59 in proximity to channel openings 56 and 58 to regulate the air flow through the channel openings 56 and 58 to allow either intake of ambient air to exhaust air from the building 16 or to blend air from the building 16 with outside air to to circulate only building air by completely closing off any intake of ambient air and exhaust of building air. Modugate damper 60 is pneumatically activated by pneumatic assembly 61 which is operated by thermostat 12. Chamber 59 also includes a building air inlet opening 62 and a building air outlet opening 64. The limits of rotation of the single damper blade 60 within the chamber 59 are set by protrusion members 66 and 68. Member 66 is attached to the top of the outlet opening 64 and member 68 is secured in proximity to the bottom of the inlet opening 62.

In a preferred embodiment of the invention (see FIGS. 3,6,7,8) modugate damper 60 comprises a modified wedge having one end 70 defining an arcuate shape and opposed end 72 tapering to an edge. In another preferred embodiment of the invention (see FIG. 9) the modugate damper 60 includes a damper blade 74 and an approximately 60° arc section 76 integrally bound to the blade 74 such that the blade 74 rotates about 60° within the chamber 59.

Air stabilization system 10 additionally comprises a spray chamber means, generally illustrated as 78, and a fan means, generally illustrated as 80, in communication with the spray chamber means 78 for circulating air from the chamber means 78 into the building 16.

Figure 4:
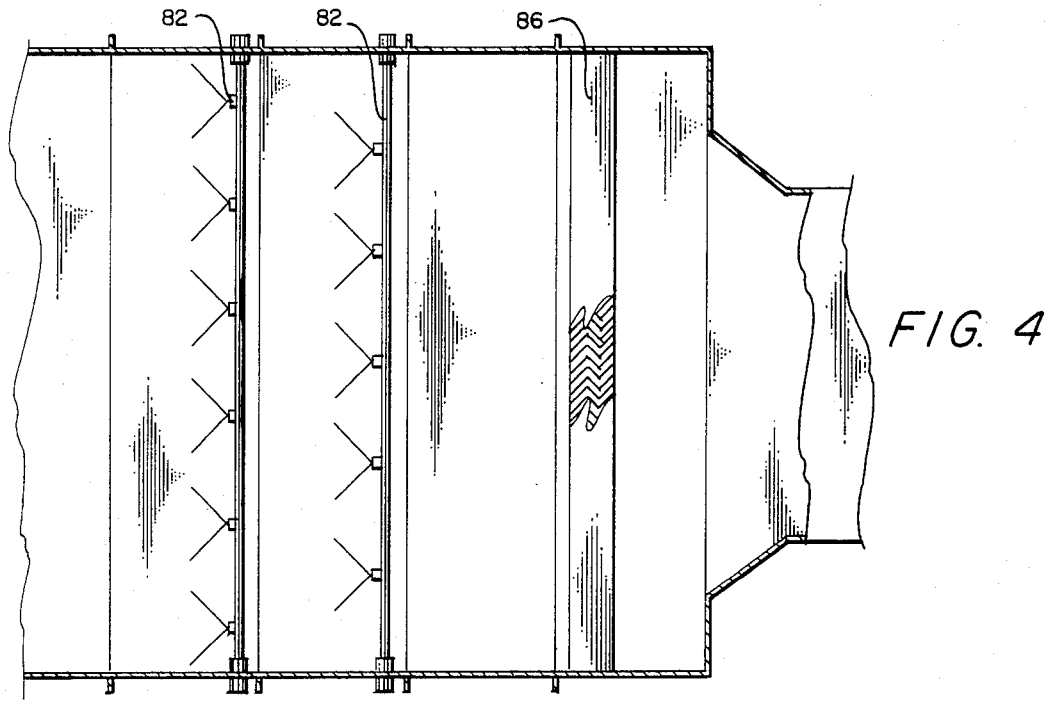
FIG. 4 is a partial horizontal sectional view taken in direction of the arrows and along the plane of line 4—4 in FIG. 1 in order to illustrate a top plan view of the nozzle sprayers.
Figure 5:
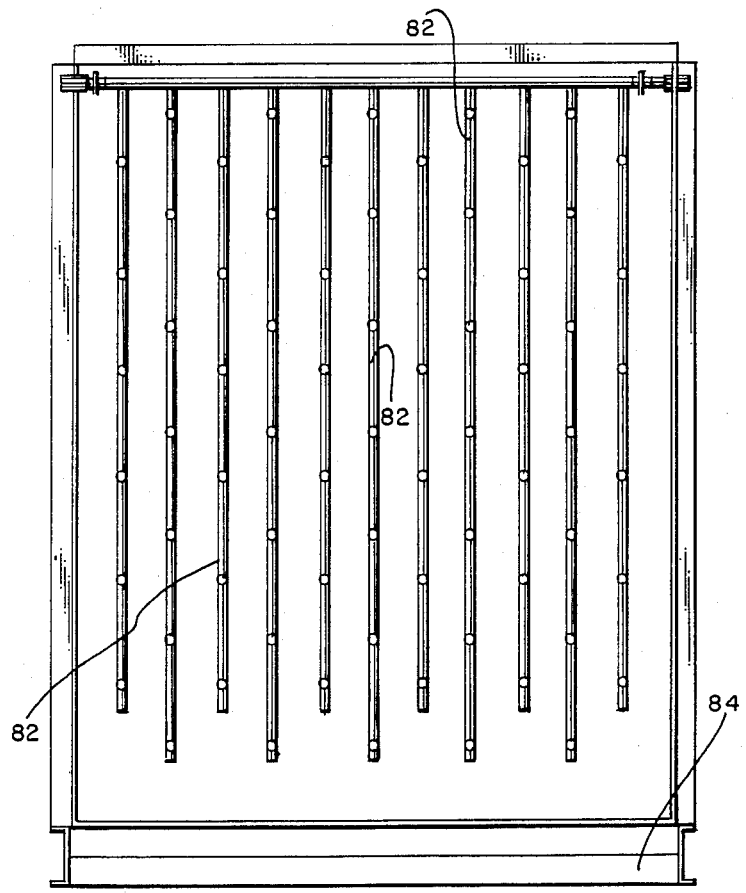
FIG. 5 is a vertical sectional view taken in direction of the arrows and along the plane of line 5—5 in FIG. 3.

Spray chamber means 78 is controlled by humidistat 14 and includes a pair of spray banks 82—82; a sump 84 positioned in the bottom of chamber means 78 for catching and holding water that is sprayed from banks 82—82; and an eliminator 86 having a cross section defining a chevron (see FIG. 4). A water pump (not shown in the drawings) actuates spray banks 82—82 per humidistat 14.

Fan means 80 includes an air foil type fan 88 operated by a motor 90.

Figure 3:
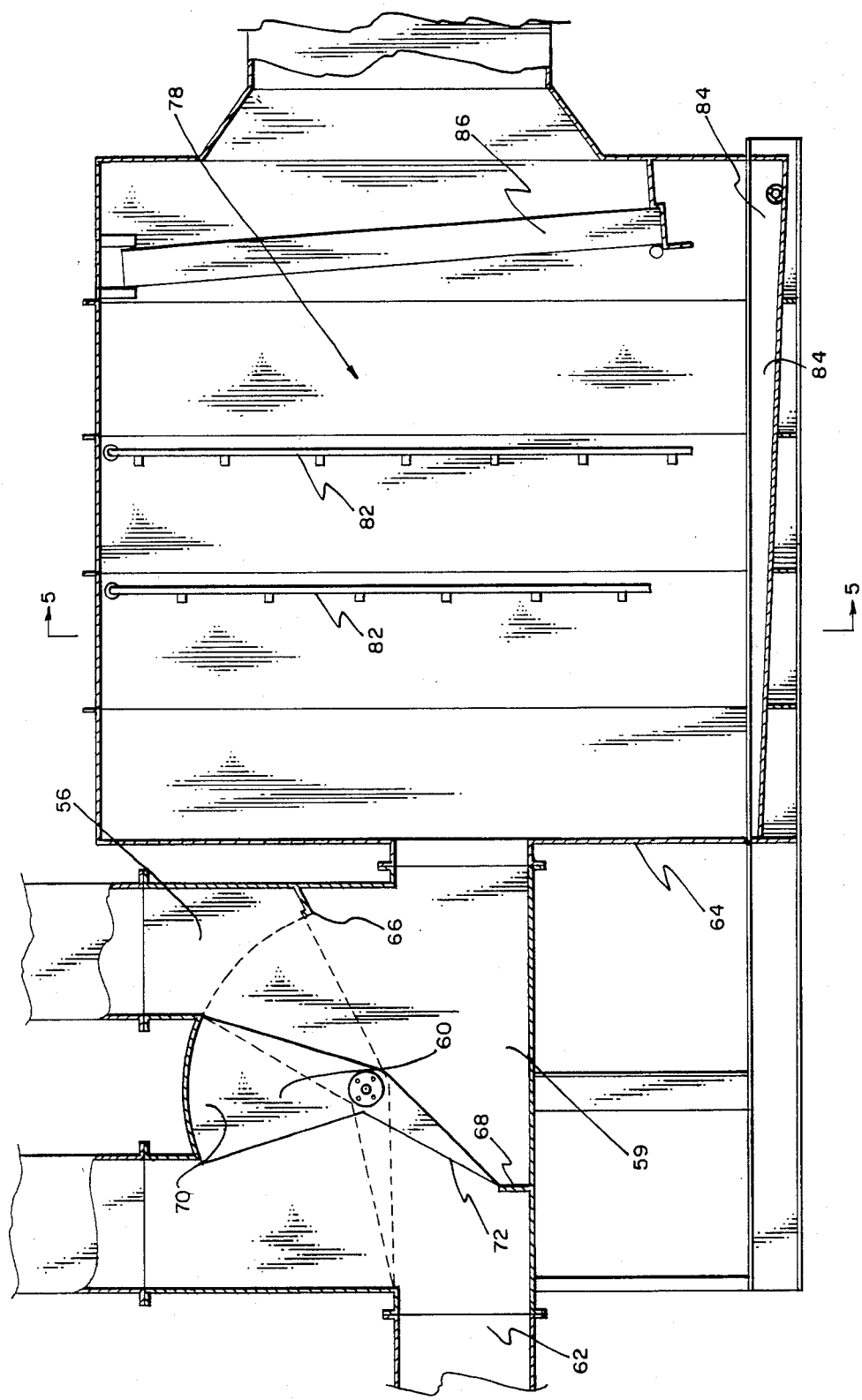
FIG. 3 is a vertical sectional view taken in direction of the arrows and along the plane of line 3—3 in FIG. 2.
Figure 6:
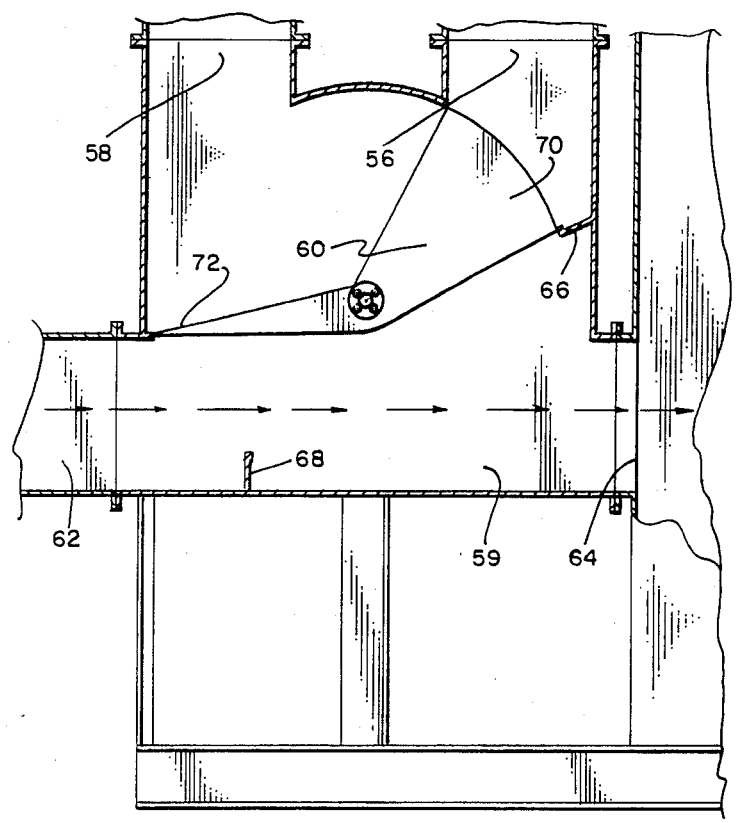
FIG. 6 is the single mixing wedge damper blade assembly in the full air return setting to only circulate air that is already within the building.
Figure 7:
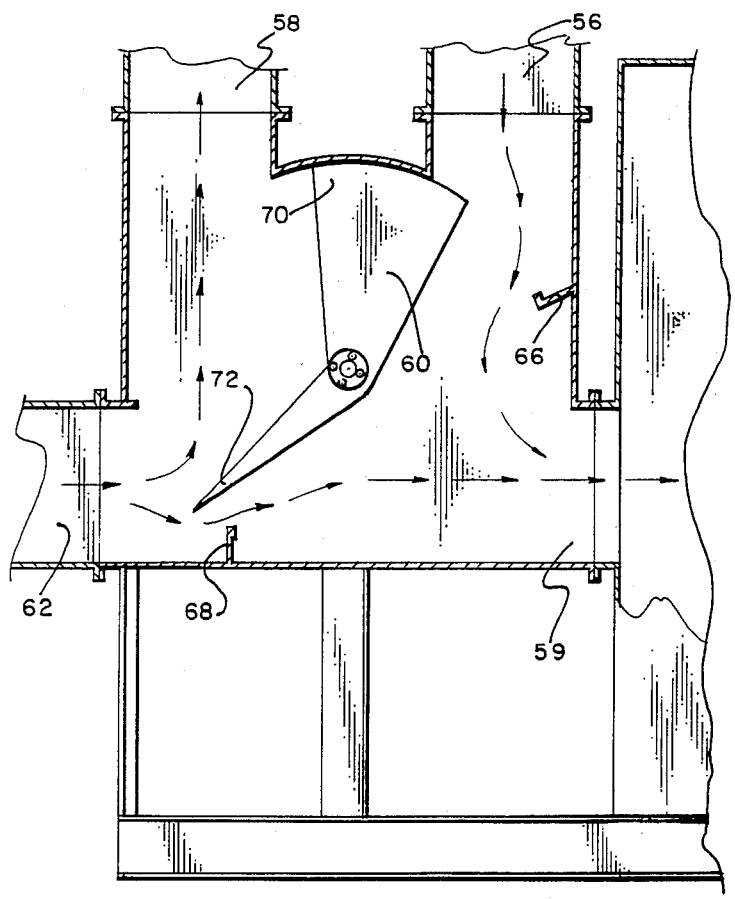
FIG. 7 is the single mixing wedge damper blade assembly in the intermediate setting in order to exhaust some building air and return the remaining building air to admix with some cooler atmospheric air.
Figure 8:
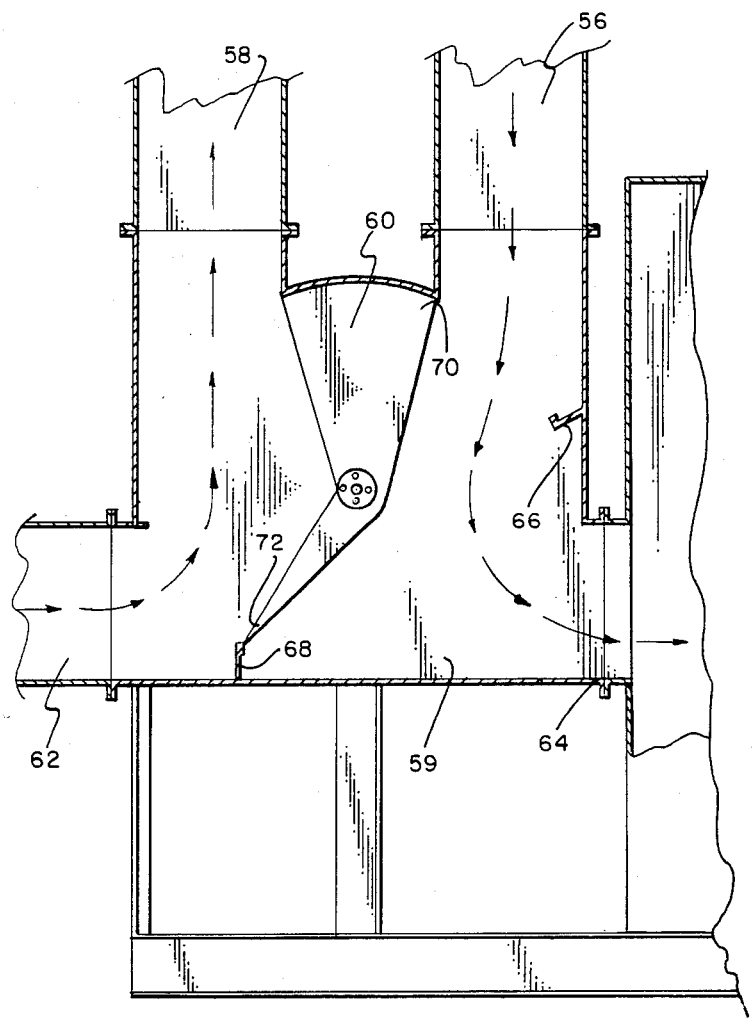
FIG. 8 is the single mixing wedge damper blade assembly in the full air exhaust setting to completely exhaust warm plant air and replace the same with cooler air drawn in from the outside.
Figure 9:
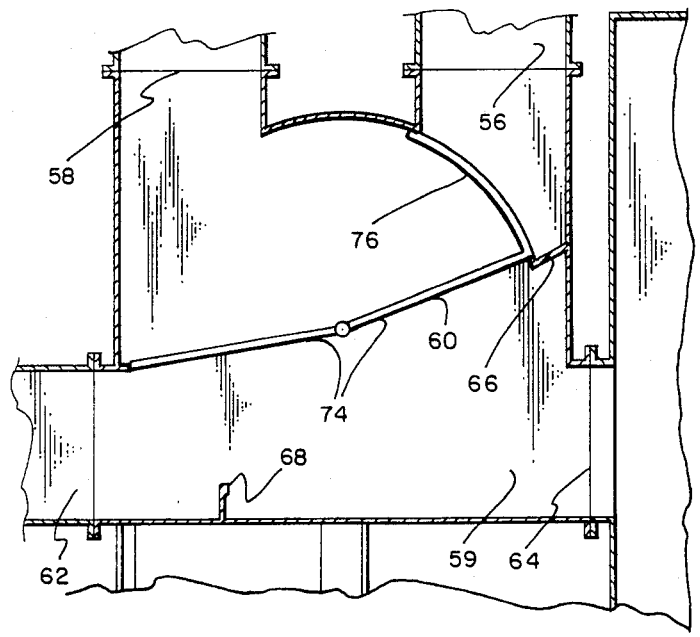
FIG. 9 is a single damper blade with an arcuate section integrally bound thereto and in the full air return setting.

With continuing reference to the drawings for operation of the invention, building air is delivered from mill 32, filter 30 and collector 28 through air inlet opening 62 by filter fan 34 under sufficient positive pressure to either vent all or a portion of the building air through the unrestricted exhaust opening 58, or all or a portion of the building air through outlet opening 64 and into the spray chamber means 78, depending on the position of the single damper blade 60. FIGS. 3 and 8 illustrate the single damper blade 60 in a full air exhaust setting wherein warm plant air is completely exhausted through exhaust opening 58 by fan 34 while simultaneously cooler air is drawn in from the outside through opening 56 by fan means 80. FIGS. 6 and 9 illustrate the single damper blade 60 in a full air return setting wherein no building air is exhausted through exhaust opening 58 and no cooler air is drawn in from the outside through opening 56; only building air is circulated from fan 34 through the spray chamber means 78 and back into the building 16 by fan means 80. In the preferred (and most frequent) intermediate setting (see FIG. 7) some building air is exhausted through exhaust opening 58 and the remainder is passed around tapered end 72 to be admixed with the outside air prior to being passed into the spray chamber means 78 to be humidified. The position of the damper blade 60 depends on the amount of heat needed in the air. If more heat is needed, the tapered end 72 (or blade 74) will move (thermostatically controlled by thermostat 12) to recycle more warm building air, while the arcuate shaped end 70 (or arc section 76) moves to reduce the intake of outdoor air, resulting in a warmer mixture. If less heat is needed to satisfy the thermostat 12, the tapered end 72 will move in the opposite direction which will open the arcuate shaped end 70 (e.g. to 60% open) to increase the intake of outdoor air and close the tapered end 72 (e.g. to 40% closed) to recycle less warm building air. Thus, the resulting mixture of air will be 40% recycle and 60% exhaust. Thus, the air volume from outdoors is matched by the volume exhausted outdoors. This maintains constant pressure in the building 16, while the temperature and the total air through put (through chamber means 78) also remains constant. Utilization of the single blade damper means 60 with spray chamber 78 is not mandatory; it may be used independently of the spray chamber 78 where humidity control is not essential.

While the present invention has been described herein with reference to particular embodiments thereof, a latitude of modifications, various changes, and substitutions are intended in the foregoing disclosure, and it will be appreciated that in some instances some features of the invention will be employed without a corresponding use of other features without departing from the scope of the invention as set forth.

I claim:

1. In an improved air stabilization system used in a building ventilation system which has an air propulsion means for delivering and/or intaking air through a plurality of openings in a housing having a damper assembly, wherein the improvement comprises a single mixing damper blade means rotatably positioned within the housing such as to regulate the air flow through the openings of the housing to allow either intake of ambient air to exhaust air from the building or to blend air from the building with outside air or to circulate only building air by completely closing off any intake of ambient air and exhaust of building air; said housing additionally includes at least one protrusion member secured to the inside thereof in order to define the limits of rotation of the single damper blade means within the housing; the openings of said housing comprises an ambient air intake opening, an ambient exhaust opening, a building air inlet opening, and an outlet opening; said housing comprises an outlet protrusion member attached to the top of said outlet opening and an inlet protrusion member secured in proximity to the bottom of said building air inlet opening; a spray chamber means in communication with said outlet opening of said housing, said spray chamber means comprises a sump means positioned within the bottom thereof, a spray bank means, and an eliminator means having a cross section defining a chevron; a fan means in communication with the spray chamber means for circulating air from the chamber means into the building; said damper blade means comprises a modified wedge having one end with a first axis of arcuate shape and another opposed end with a second axis and tapering to an edge, said first axis and said second axis having an angle with respect to each other of greater than about 90° but less than about 180°.

2. In an improved air stabilization system used in a building ventilation system which has an air propulsion means for delivering and/or intaking air through a plurality of openings in a housing having a damper assembly, wherein the improvement comprises a single mixing damper blade means rotatably positioned within the housing such as to regulate the air flow through the openings of the housing to allow either intake of ambient air to exhaust air from the building or to blend air from the building with outside air or to circulate only building air by completely closing off any intake of ambient air and exhaust of building air; said housing additionally includes at least one protrusion member secured to the inside thereof in order to define the limits of rotation of the single damper blade means within the housing; the openings of said housing comprises an ambient air intake opening, an ambient exhaust opening, a building air inlet opening, and an outlet opening; said housing comprises an outlet protrusion member attached to the top of said outlet opening and an inlet protrusion member secured in proximity to the bottom of said building air inlet opening; a spray chamber means in communication with said outlet opening of said housing, said spray chamber means comprises a sump means positioned within the bottom thereof, a spray bank means, and an eliminator means having a cross section defining a chevron; a fan means in communication with the spray chamber means for circulating air from the chamber means into the building; said damper blade means comprises a damper blade section and an opposed blade section, an approximately 60° arc section integrally bound to said blade section, said damper blade section having a first axis and said opposed blade section having a second axis, said first axis and said second axis having an angle with respect to each other greater than about 90° but less than about 180°, said damper blade section and said opposed blade section rotate about 60° within the housing about their axis.

* * * * *